United States Patent [19]
Krider

[11] 3,937,951
[45] Feb. 10, 1976

[54] ALL-SKY PHOTOELECTRIC LIGHTNING DETECTOR APPARATUS

[75] Inventor: Edmund Philip Krider, Tucson, Ariz.

[73] Assignee: United States of America as represented by the Secretary of the Navy, Washington, D.C.

[22] Filed: Dec. 9, 1974

[21] Appl. No.: 530,643

[52] U.S. Cl............ 250/209; 250/211 R; 250/216; 356/1
[51] Int. Cl.² ........................................ H01J 39/12
[58] Field of Search........ 250/206, 208, 209, 211 R, 250/211 J, 214 R, 216, 558; 356/1, 152, 172, 226

[56] References Cited
UNITED STATES PATENTS

| | | | |
|---|---|---|---|
| 3,147,380 | 9/1964 | Buckingham et al. | 250/214 R X |
| 3,226,557 | 12/1965 | Goodman | 250/216 X |
| 3,515,879 | 6/1970 | Weischendel et al. | 250/208 X |
| 3,801,821 | 4/1974 | Sharpe et al. | 250/209 |

*Primary Examiner*—Alfred E. Smith
*Assistant Examiner*—E. R. LaRoche
*Attorney, Agent, or Firm*—Richard S. Sciascia; Paul N. Critchlow

[57] ABSTRACT

A pair of position sensing photodiodes of a conventional quadrature or dual-axis type are deployed face-upwardly at a predetermined distance one from the other. A vertically pointing fisheye lens covers each of the position sensing diodes so that the diodes view a full 360° in azimuth and about 180° in zenith angle. Each of the diodes produces four current outputs whose fractional distribution provides the location of the optical center of a luminous source, such as a lightning discharge. The outputs, in turn, are applied to a data acquisition system, such as a simple analog computer, which provides the location data for the lightning discharge as well as its total intensity. The circuit applying the outputs to the data acquisition system includes filtering means for eliminating background noises and passing to the system only the optical transients of the discharge.

4 Claims, 3 Drawing Figures

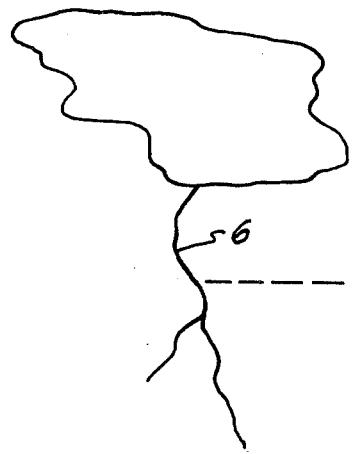
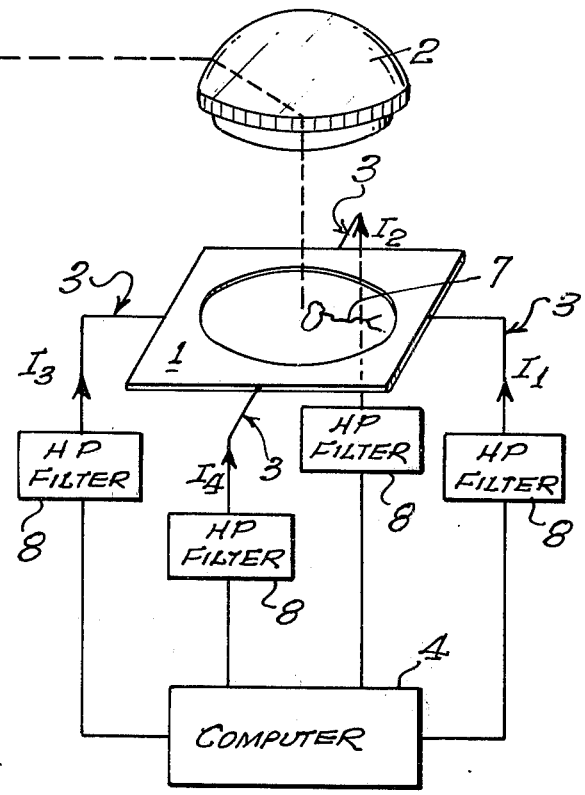
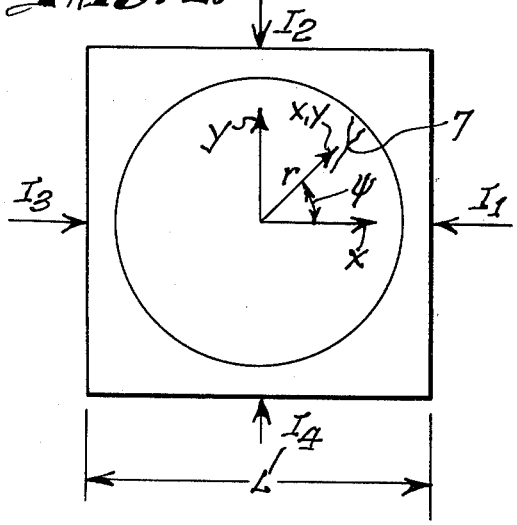
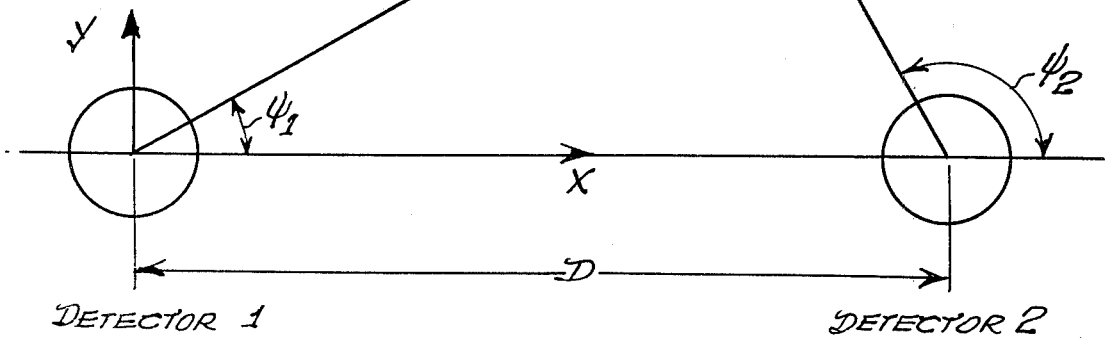

3,937,951

ALL-SKY PHOTOELECTRIC LIGHTNING DETECTOR APPARATUS

BACKGROUND OF THE INVENTION

The present invention relates to lightning detectors capable of detecting, locating and determining the intensity of lightning discharges.

Present methods for locating lightning discharges are based in large part on providing instruments capable of detecting electromagnetic fields or optical transients produced by the discharge. Crossed-loop direction finders and other versions of sferics detectors are in common use as are cameras and T.V. systems. Unfortunately, however, the complex nature of the emitting source, as well as the rather long wavelengths involved, limit the accuracy of these electromagnetic field techniques. Photography, on the other hand, can provide accurate angular information but it is limited in time resolution and also by the fact that it entails rather slow processing of the data. Further, photography suffers during daylight because of film exposure. Other techniques include rather sophisticated T.V. systems utilizing video recording and, although these have fair accuracy and time-resolution, they obviously become rather expensive and cumbersome particularly when widely used for many field experiments.

Although, as far as is known, position sensing photodiode detector systems have not been used for locating such transient and spatially unpredictable events as lightning discharges, it is recognized that these detectors are well known and that they have been used for locating light sources of a rather wide variety. For example, U.S. Pat. No. 3,800,146 issued Mar. 26, 1974 to Brunkhorst, Carr and Dueker describes these light sensitive detectors in some detail and further identifies other U.S. patents in which the detectors are disclosed. In general, the detector of the type presently under consideration is a light sensitive device usually having pairs of opposed output electrodes at which quadrature signals are produced and the signals that are produced vary inversely with the distance from the location of the image or light spot impinging on the detector. Thus, when the image is closer to one output electrode than to the others, a larger signal is produced at the one electrode with the result that the position of the image on the detector can be determined by determining the fractional distribution of the quadrature outputs. However, as has been indicated, the potential of such conventional detector units for locating lightning discharges has not been recognized and, simple and effective systems for realizing this potential have not been realized.

OBJECTS OF THE INVENTION

A primary object of the present invention is to provide a simple, inexpensive instrument for detecting and locating lightning discharges in real time.

Another related object is to provide a simple detector apparatus capable of viewing substantially the entire sky and its horizon so as to provide in real time the desired location data with an accuracy of at least 1° in azimuth and 2° in zenith angle.

Another object is to provide a lightning detector which also can be used to measure the propagation speed of the lightning.

A further object is to provide the position sensing in a manner that is independent of detector gain or atmospheric attenuation of the light radiation signals and, in a manner which will be described, this feature is permitted by utilizing a system in which the location data is determined only by using the ratios of the four output signals of each of the detectors.

Yet another object is to provide the XY lightning coordinates which represent the lightning location data in terms of sums, differences, products, and ratios as detector signal outputs so as to enable the calculation of the lightning coordinates by the use of simple analog circuits.

Other objects and their attendant advantages will become apparent in the ensuing description.

BRIEF DESCRIPTION OF THE DRAWINGS

The present invention is illustrated in the accompanying drawings of which:

FIG. 1 is a schematic illustrating one of the detector units disposed to receive and process the optical transients of a lightning discharge occuring at any location in the sky;

FIG. 2 is a diagrammatic plan view of one of the position sensing photodiodes showing in particular, the coordinate system used for locating the lightning image on the photodiode detector, and FIG. 3 is another schematic showing the use of a pair of photodiode detectors deployed to permit a resolution of the X and Y coordinates of a particular lightning discharge or, in other words, to permit the location of the lightning discharge by means of its X and Y coordinates.

DETAILED DESCRIPTION OF THE INVENTION

The system illustrated in FIG. 1 includes a dual-axis quadrature-output, position-sensing photodiode 1, a fisheye lens 2 and circuit means 3 coupling the outputs of the photodiode to a data acquisition system such as a computer 4. As shown, fisheye lens 2 is an optical lens such as a 220° fisheye pointed vertically to view substantially the entire sky and preferably to view a full 360° in azimuth and over 180° in zenith angle. Consequently, a lightning discharge, such as discharge 6 occurring at any location in the sky is imaged by lens 2 on detector 1 and the location of the optical center of the lightning discharge will vary in accordance with the location in the sky of the lightning itself. Although the use of a fisheye lens provides a simple, effective means for viewing the entire sky, it is recognized that other arrangements, such as the use of parabolic reflectors, can be substituted.

Position sensing photodiode 1 is, as already has been noted, a conventional and rather well known device comparable to the devices or detectors described in the referenced U.S. Pat. No. 3,800,146. For present purposes however, it is desired to use a detector or photodiode unit having a sufficiently wide dynamic range and position sensing capability to accommodate the lightning discharge images and, in particular, an example of an appropriate detector is a planar, dual-axis unit known as PIN–SC 50 manufactured by United Detector Technology, Inc., in Santa Monica, Calif. As shown in FIG. 1, impingement on the detector of the light radiations from discharge 6 is capable of providing a lightning discharge image 7 on the detector and the impingement of this light radiation on the detector, in turn, produces four output signals or currents identified in FIG. 1 and $I_1$, $I_2$, $I_3$, and $I_4$. Depending upon the location of the optical center of image 7, these currents have varying magnitudes to the extent that the output is greatest at the nearest output electrode, while the other outputs vary in accordance with their distances from the optical center of image 7. Consequently, it becomes a simple matter to determine the location of the optical center of the image on the diode by analyzing the fractional distribution of these four output signals. The total of the outputs proportional to the total intensity of the light source at the detector so that, by proper calibration, the intensity of the lightning itself can be determined.

However, accuracy or the resolution precision of the system also requires that the information applied to the data acquisition system, such as computer 4 or, whatever other data-reducing device may be employed, be representative solely of the optical transients of the lightning discharge itself as distinguished from any background noise or other random background variations such as would not be truly representative of the optical transients of the discharge. To achieve this purpose, circuits 3 which are used to apply the four signal outputs to computer 4 each include a filtering means, such as high pass filters 8 which are capable of removing this undesired AC background. Obviously, a wide variety of filtering means can be used for this purpose although it is preferred to utilize a simple capacitor which, for present purposes, may have a value of about one microfarad.

FIG. 2 further illustrates the position-sensing, photodiode detector of FIG. 1. Thus, FIG. 2 includes lightning image 7 which, as may be noted, defines a coordinate system centered on the detector to permit the optical center of light image 7 to be located by its XY coordinates. As also will be noted, the FIG. 2 representation includes the four output currents as well as a length L which is the width of the detector itself. Using a centered coordinate system as shown, the X and Y coordinates of the center of the light image are approximately:

$$X = \frac{L}{2}\left(\frac{I_1 - I_3}{I_1 + I_3}\right) \quad Y = \frac{L}{2}\left(\frac{I_2 - I_4}{I_2 + I_4}\right) \quad (1)$$

also, the tangent of the azimuth angle $\psi$ to the light image is:

$$\tan \psi = \frac{Y}{X} = \frac{(I_1 - I_3)(I_2 + I_4)}{(I_2 - I_4)(I_1 + I_3)} \quad (2)$$

these relationships, as will be recognized, are theoretically valid although there may be deviations produced by detector non-uniformity. If so, such deviations can be corrected by laboratory calibration or, if needed, by incorporating corrective circuitry into the data acquisition. It further is recognized that light scattering may introduce errors by producing a shift in the image. This type of error is common to all optical detectors and, if considered appropriate, the instrument can be modified to accommodate it.

One further advantage of the all-sky detector is that it provides a simple, inexpensive and reliable method for determining the propagation speed of lightning. Thus, because of the so-called 'all-sky' view and also because of the real time operation of the instrument, it is possible to obtain a series in rapid succession of position and intensity measurements. The image of the lightning during the rapidly-successive measurements will change and the rate of change will provide a reliable measure of the speed of propagation.

Also, the zenith angle to the optical center of a light source can be found if the zenith angle projection of fisheye lens 2 is known. For example, if the zenith angle scales linearly with the radial distance R (FIG. 2), it can very simply be found from the following equation $\theta = Kr$. Further, since the small r is an hypotenuse, $\theta = K(x^2+y^2)$ to the exponent ½ where $x$ and $y$ are given by equation (1) and K is equidistant projection factor of the lens. In other situations, if K is not constant, the zenith angle can be determined rather simply by laboratory calibration.

FIG. 3 illustrates the present method of determining the location of the lightning discharge itself or, in other words, determining the X and Y coordinates of the lightning discharge. Determination of the lightning discharge X and Y coordinates requires the use of two detectors identified as detector one and detector two operated simultaneously at a known distance D one from the other all as shown in FIG. 3. Specifically, the X and Y coordinates of a lightning discharge are found to be:

$$X = \frac{D \tan\psi_2}{\tan\psi_2 - \tan\psi_1} \quad (4)$$

$$Y = \frac{D \tan\psi_1 \tan\psi_2}{\tan\psi_2 - \tan\psi_1} \quad (5)$$

where $\tan \psi_1$ and $\tan \psi_2$ are the tangents of azimuth which, in turn, can be determined from the detector output currents by the use of equation 2.

Using the foregoing relationships and applying them to the deployment of the two detectors one and two (FIG. 3) it becomes a relatively simple matter to a data acquisition system such as computer 4, in which the analog information provided by the detector outputs ($I_1$–$I_4$) of both detectors can be analyzed, to resolve the desired azimuth coordinates X and Y of the lightning discharge, as well as the zenith angle needed to locate the discharge within the sky. One important factor to be noted is that since the angles are determined solely by the use of the ratios of the signals, the position sensing is independent of any detector gain and/or atmospheric attenuation of the light signals. Further, since the lightning coordinates are given entirely in terms of sums, differences, products and ratios of signal currents it is possible to calculate these coordinates using simple analog circuits in real time. Consequently, an all-sky photoelectric lightning detector can be provided in a simple, accurate and easily calibrated system well adapted for use in lightning field experiments. Additionally, such a detector system has a wide dynamic range and can be used during day or night. Finally, the information needed to locate the lightning is presented in the form of four analog signals easily interfaced to a conventional data acquisition system so as to be capable of being analyzed in real time. Laboratory tests of photo type detectors indicate a resolution of $10^{-6}$ seconds in time with 1° in azimuth and 2° in zenith angle although it is recognized that significant improvements in resolution can be achieved by refinement of the circuitry and actual components used in the prototype.

Obviously many modifications and variations of the present invention are possible in the light of the above teachings. It is therefore to be understood that within the scope of the appended claims the invention may be practiced otherwise than as specifically described.

I claim:

1. All-sky photoelectric apparatus for detecting and locating lightning discharges comprising:

a pair of wafer-like planar detector members disposed horizontally with their vertical axes spaced apart a predetermined distance (D), said members each including means responsive to impinging optical radiations for producing XY quadrature electrical signal outputs corresponding in magnitude to the XY wafer location of the impinging radiation, optical means for imaging substantially the entire sky on the detectors whereby a lightning discharge radiation occurring at any sky location is optically imaged simultaneously at a related location on both of said detectors, data acquisition means, and circuit means coupling said quadrature signal outputs to said data acquisition means, said circuit means including background-filtering means for passing to said acquisition means signal information substantially wholly representative of the optical transients of the lightning discharges, said data acquisition means being responsive to said filtered information for providing in real time said lightning discharge location data.

2. The apparatus of claim 1 wherein said optical means is a fisheye lens.

3. The apparatus of claim 1 wherein said data acquisition means includes means for determining the total intensity of the lightning discharge at the detectors.

4. The apparatus of claim 1 wherein said data acquisition means is formed to utilize only the information contained in said XY coordinate signal outputs of each of said pair of detector members for locating the lightning discharge.

* * * * *